July 12, 1932.  W. A. BARNES ET AL  1,866,874
ELECTRIC TOASTER
Filed Nov. 24, 1930  2 Sheets-Sheet 1
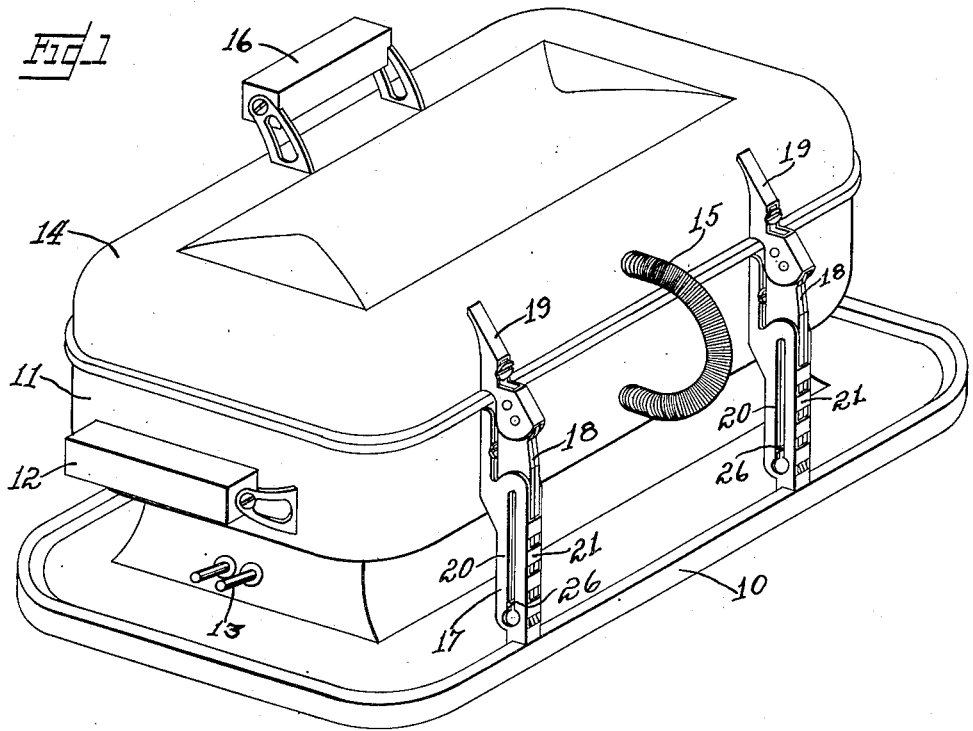
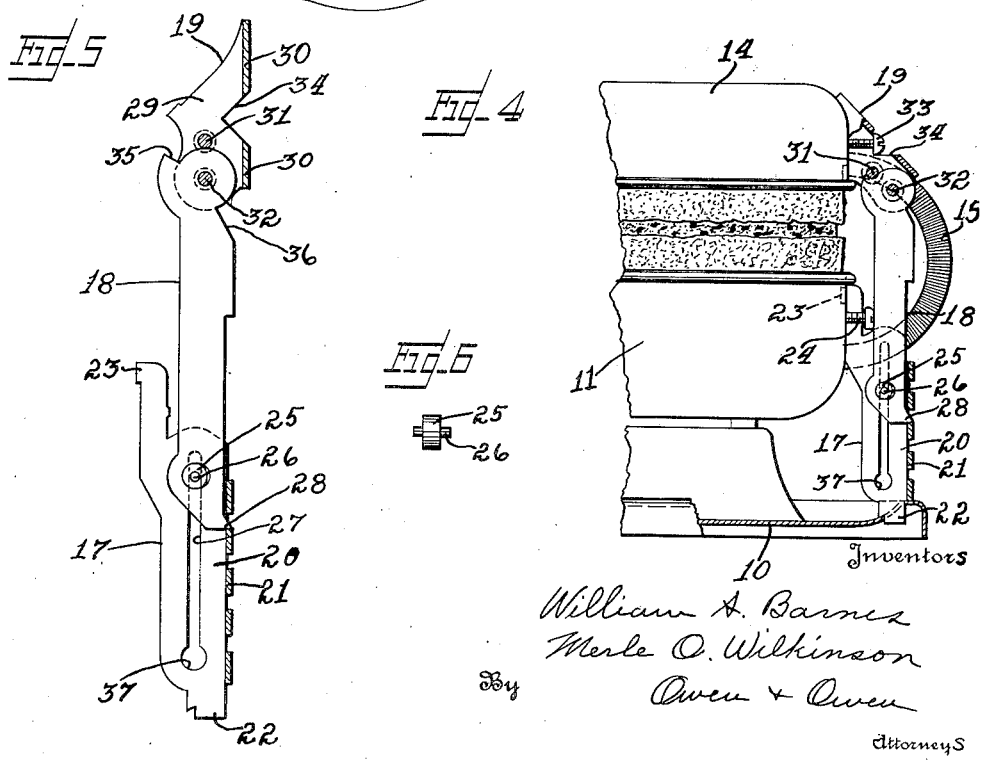
Inventors
William A. Barnes
Merle O. Wilkinson
By Owen & Owen
Attorneys July 12, 1932.  W. A. BARNES ET AL  1,866,874
ELECTRIC TOASTER
Filed Nov. 24, 1930  2 Sheets-Sheet 2
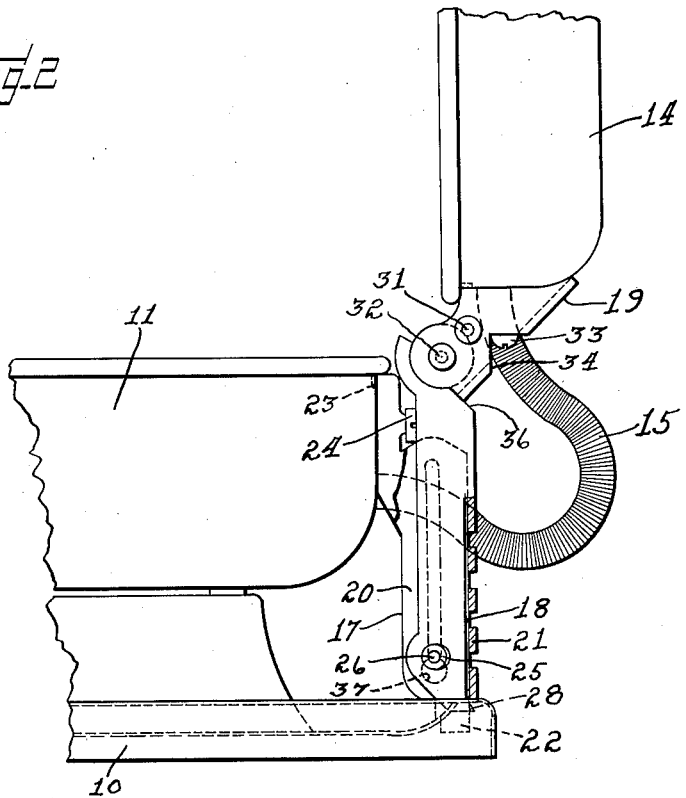
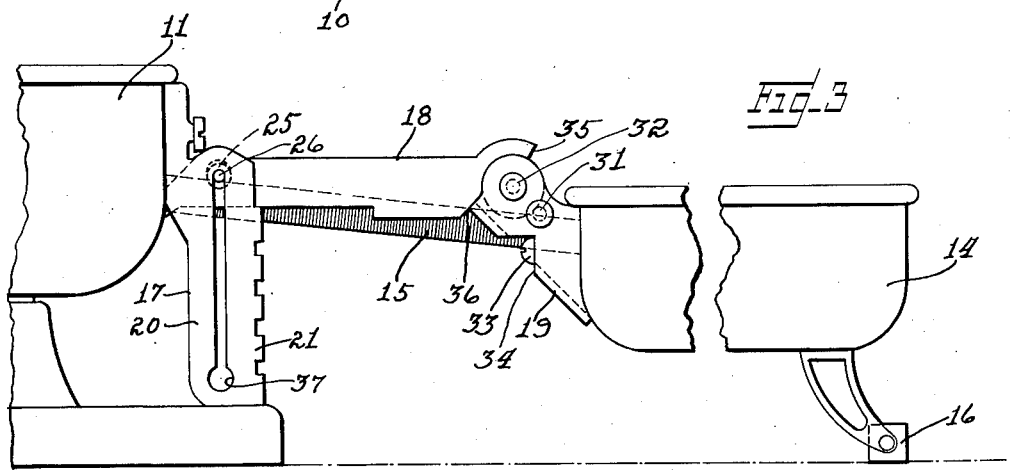
Inventors
William A. Barnes
Merle O. Wilkinson
By Owen + Owen
Attorneys Patented July 12, 1932

1,866,874

UNITED STATES PATENT OFFICE

WILLIAM A. BARNES AND MERLE O. WILKINSON, OF TOLEDO, OHIO, ASSIGNORS TO THE SWARTZBAUGH MANUFACTURING COMPANY, OF TOLEDO, OHIO, A CORPORATION OF OHIO

ELECTRIC TOASTER

Application filed November 24, 1930. Serial No. 497,694.

This invention relates to an electric toaster of the type which comprises two heating units hingedly connected to each other and adapted to receive a sandwich or the like between them.

The general object of the invention is to provide improved means whereby the distance between the plates may be readily adjusted to the thickness of the sandwich or other article to be toasted. The present construction also permits the upper heating unit to be positively held in raised position while the article is inserted or removed, or the upper unit may be folded back until it rests in the same plane as the lower unit, thereby making it convenient to use both units as griddles.

A further object of the invention is to provide a construction which is so designed that the various parts thereof may be readily produced by machinery at a minimum cost and may be easily assembled.

The invention will be more particularly explained in connection with the accompanying drawings, in which Figure 1 is an isometric view of the toaster.

Figure 2 is a partial side elevation of the same with the upper heating unit raised, a portion of the hinge being shown in section.

Figure 3 is a partial side elevation of the invention in position to be used for frying cakes.

Figure 4 is a side view partly in elevation and partly in section, showing the invention in position for toasting a sandwich.

Figure 5 is a detail sectional view of the hinge connection.

Figure 6 is a detail view of a hinge pin used in connection with the invention.

As illustrated in the drawings, the toaster comprises a base 10 to which the lower heating unit 11 is secured. This heating unit is preferably provided with handles 12 and electric current is supplied thereto through suitable terminals 13. Operatively associated with the lower heating unit 11 is an upper heating unit 14 to which current is supplied through a cable 15. The unit 14 may be raised or lowered by means of a handle 16.

In the present construction there are two hinge connections between the heating units 11 and 14. Each of these connections comprises a bracket 17 secured to the unit 11, a bracket 19 secured to the unit 14, and a member 18 adjustably connecting the two brackets.

The bracket 17 is readily made from a stamping and is formed with spaced plates 20 connected by a series of webs 21. The reduced lower ends 22 of the plates 20 are inserted in slots or recesses formed in the base 10 and the upper ends 23 are inserted in slots or recesses in the housing of the heating unit 11 and the bracket is then secured by a screw 24 or similar means.

The hinge member 18 is connected to the bracket 17 between the plates 20 thereof by a hinge pin 25 having reduced projecting ends 26 which are guided for upward and downward movement in slots 27 formed in the plates 20. The lower end of the member 18 is formed with a shoulder 28 which is adapted to selectively engage the upper edge of one of the webs 21 to support the member 18 at the desired elevation with respect to the slot 27. The width of the member 18 is such as to allow sufficient play within the bracket 17 about the pin 25 to permit the shoulder 28 to engage the upper edges of the webs 21 but to be disengaged therefrom when it is desired to lower said member and the heating unit 14 supported thereby.

The bracket 19 is likewise formed with opposed plates 29 which are connected by webs 30 and are adapted to straddle the upper end of the member 18. The plates 29 are connected by pins or rivets 31 and 32, one of which, as 32, passes through the upper end of the member 18 and constitutes a pivotal connection between said member and the bracket 19. The bracket 19 is secured to the housing of the upper heating unit 14 by suitable means, such as a screw 33 the head of which engages a notch 34 formed in said bracket. When the member 18 is raised, as shown for example in Figure 4, the downward movement of the heating unit 14 about the pivot 32 is limited to a position substantially parallel to the lower heating unit 11 by the engagement of the pin 31 with a shoulder 35 formed on the member 18. The upward and rearward movement of the heating unit 14 to the position shown in Figure 2 is limited by the engagement of the lower web 30 with a shoulder 36 formed on the member 18.

In the use of the invention for toasting sandwiches or other articles, the heating unit 14 is raised to the position shown in Figure 2 to permit such article to be inserted. The unit 14 is then adjusted approximately to the position shown in Figure 4 with the heating surface resting on the upper surface of the article to be toasted and with the shoulder 28 projecting between two of the webs 21. As the sandwich or other article shrinks, the upper unit 14 will settle until the shoulder 28 engages the edge of the web 21 thereebeneath which permits the completion of the toasting in the most satisfactory manner without too much pressure on the sandwich.

In the usual adjustment of the unit 14, the rearward pivotal movement of the member 18 about the pivot pin 25 is limited by its engagement with the uppermost web 21. When the member 18 is raised, however, as far as the slots 27 will permit, the member 18 and the unit 14 may be swung rearwardly and downwardly to the position shown in Figure 3, in which the handle 16 acts as a support and the heating surfaces of the two units 11 and 14 may be used as a griddle for frying cakes.

For convenience in assembling the various parts of the hinge connections, the lower ends of the slots 27 are enlarged as shown at 37 sufficiently to permit the hinge pin 25 to be inserted between the plates 20. Before the bracket 17 is secured to the unit 11, therefore, the hinge member 18 is inserted between the plates 20 and the pin 25 is inserted. After the bracket 17 is secured to the unit 11, the lower end of the member 18 will not permit the latter to be lowered far enough to permit the pin 25 to fall out through the enlarged opening 37.

From the foregoing description, it will be seen that we have provided a very convenient toaster which may be readily produced on a large scale by automatic machinery at a low cost and may be very easily assembled. The heating units 11 and 14 may be readily adjusted to accommodate articles of various thickness and will always be held in substantially parallel relation. The device is also useful as a griddle as shown in Figure 3.

While we have shown and described in detail one embodiment of the invention it is obvious that the same can be considerably modified without departing from the scope of the appended claims.

What we claim is:

1. In combination, a unit including spaced side walls with a series of shoulders adjacent thereto, a hinge member having a slidable rockable connection with said unit between said side walls and having a shoulder selectively engageable with said series of shoulders to adjustably limit the slidable movement of the hinge member, a second unit pivotally connected to said hinge member, and coengaging means on said second unit and said hinge member limiting the movement of said second unit in either direction about its pivot.

2. In combination, a lower unit including a base, a heating plate, and a detachably mounted bracket having spaced side walls connected to form a channel, a hinge member slidable within said channel, a pivot pin on which said hinge member is pivoted, said pivot pin being guided for vertical movement between said side walls, an upper heating unit pivotally connected to said hinge member, and coengaging means on the upper heating unit and said hinge member to limit the pivotal movement of one unit toward the other to a position substantially in parallel spaced relation thereto.

3. In combination, a lower unit including a base, a heating plate, and a detachably mounted bracket having spaced side walls connected to form a channel, a hinge member slidable within said channel, a pivot pin on which said hinge member is pivoted, said pivot pin being guided for vertical movement between said side walls, one of said walls having an opening through which the pivot pin may be inserted or removed when brought in registry therewith, said unit being formed with an abutment preventing such registry of the pivot pin except when the bracket is detached.

4. In an electric toaster, the combination of a lower heating unit, an upper heating unit, connecting means between the two units, said connecting means including brackets secured to the respective units, a hinge member pivoted to one bracket and having a slidable pivotal connection with the other bracket, selectively coengageable shoulders to support the hinge member in various positions of adjustment, and means engageable with the hinge member to limit the pivotal movement of one unit toward the other to a position substantially in parallel spaced relation thereto.

5. In combination, a unit including spaced side walls with a series of shoulders adjacent thereto, a hinge member having a slidable rockable connection with said unit between said side walls and having a shoulder selectively engageable with said series of shoulders to adjustably limit the slidable movement of the hinge member, a second unit pivoted to said hinge member, and means on said second unit engageable with the hinge member to limit the pivotal movement of said second unit toward the first-mentioned unit to a position substantially in parallel spaced relation thereto.

In testimony whereof we have hereunto signed our names to this specification.

WILLIAM A. BARNES.
MERLE O. WILKINSON.